United States Patent [19]

Nagai

[11] 4,172,872

[45] Oct. 30, 1979

[54] METHOD OF MOLDING LARGE-SIZED PLASTICS

[76] Inventor: Yoshiharu Nagai, 7-27, 2-Chome Hachizuka, Ikeda-Shi, Osaka-Fu, Japan

[21] Appl. No.: 716,333

[22] Filed: Aug. 20, 1976

Related U.S. Application Data

[63] Continuation of Ser. No. 494,373, Aug. 2, 1974, abandoned.

[30] Foreign Application Priority Data

Aug. 6, 1973 [JP] Japan .................................. 48-88636

[51] Int. Cl.² .............................................. B29F 1/00
[52] U.S. Cl. ...................................... 264/519; 264/571; 264/102; 264/327; 264/328; 425/546; 425/589
[58] Field of Search ............... 264/327, 328, 329, 101, 264/102, 571, 519; 425/546, 589

[56] References Cited

U.S. PATENT DOCUMENTS

| 2,781,547 | 2/1957 | Moxness | 264/327 |
| 2,926,386 | 3/1960 | Hutchinson | 264/328 X |
| 3,345,442 | 10/1967 | Oxel | 264/328 X |
| 3,357,057 | 12/1967 | Bucy | 264/102 X |
| 3,596,325 | 8/1971 | Hehl | 425/589 X |
| 3,671,168 | 6/1972 | Nussbaum | 264/328 X |
| 3,674,386 | 7/1972 | Orth | 264/328 X |
| 3,763,293 | 10/1973 | Nussbaum | 264/327 X |
| 4,020,137 | 4/1977 | Lachner et al. | 264/102 X |

FOREIGN PATENT DOCUMENTS

1009227 11/1965 United Kingdom .................... 264/329

Primary Examiner—Jan H. Silbaugh
Attorney, Agent, or Firm—Robert E. Burns; Emmanuel J. Lobato; Bruce L. Adams

[57] ABSTRACT

A method of molding large-sized plastics is disclosed, in which is used an apparatus comprising an extruding means and a die clamping device composed of a stationary die plate and a movable die plate, both being able to be connected to each other in order to clamp the die or separated to open the die with tie bars on the movable die plate inserted into or drawn out of the stationary die plate, and a die of thin plate make attached to the die clamping device and comprising a cavity and a core, each being partitioned into a plurality of small sections in order to control the temperature of each section separately. Thus, a molten material is extruded into the die after it is heated partially at different temperatures required, and, after it is cooled down partially at different rate required, the solidified article is taken out of the die, so that a large-sized article of good quality is obtained with low molding costs. The die is less expensive and easy to handle, and the replacement of it is also very easy.

2 Claims, 5 Drawing Figures

METHOD OF MOLDING LARGE-SIZED PLASTICS

This is a continuation, of application Ser. No. 494,373, filed Aug. 2, 1974, now abandoned.

BACKGROUND OF THE INVENTION

This invention relates to a method of molding large-sized plastics, which are difficult to mold by usual injection methods, with simple apparatus and metal dies and with low costs.

Recently, the plastics industry is at a turning point, shifting from the age of mass production and mass consumption to that of using resources effectively. For effective utilization of plastics materials in compliance with this tendency there arise need to manufacture in small lots very large-sized articles, which are difficult to mold by conventional injection methods.

According to usual injection molding, large-sized articles can not be molded by using dies of thin metallic plate because of increased injection pressure, and it is required for molding such articles to use dies of extremely high strength and powerful die clamping mechanisms, which causes increased molding costs.

SUMMARY OF THE INVENTION

An object of the invention is to enable molding of large-sized plastics, difficult to mold by conventional injection molding, with low costs by using a simple apparatus and a die made of thin metallic plate, without necessitating the use of any die of high strength and powerful die clamping mechanism.

Another object of the invention is to provide an easy and effective method of molding large-sized plastics using a die of thin metallic plate.

Still another object of the invention is to provide an apparatus, in which replacement of the die for large-sized articles can be easily performed by moving it horizontally, without lifting it above the tie bars.

The present invention, which attains above objects, is characterized by using a molding apparatus comprising a die clamping device and an extruding means in combination, the die clamping device being composed of a stationary die plate and a movable die plate mounted separately and movably on a rail and connected each other through tie bars fixed with one end to the movable die plate and penetrating with the other end through the stationary die plate, and a die comprising a cavity and a core which are formed in separate assemblies of thin plates and partitioned into plurality of sections, the temperature of each section being controlled separately, and by the manner of molding that the die is first heated to required temperatures, then a molten material is extruded into it from the extruding means, and, after cooling down the die to solidify the material, the molded article(s) is taken out of the die.

BRIEF DESCRIPTION OF THE DRAWINGS

Other and further objects, features and advantages of the invention will be apparent taken in connection with the accompanying drawings. It should be explicitly understood, however, that various modifications within the scope of the claims may be made without departing from the spirit of the invention.

DESCRIPTION OF THE PREFERRED EMBODIMENTS

Figure 1:
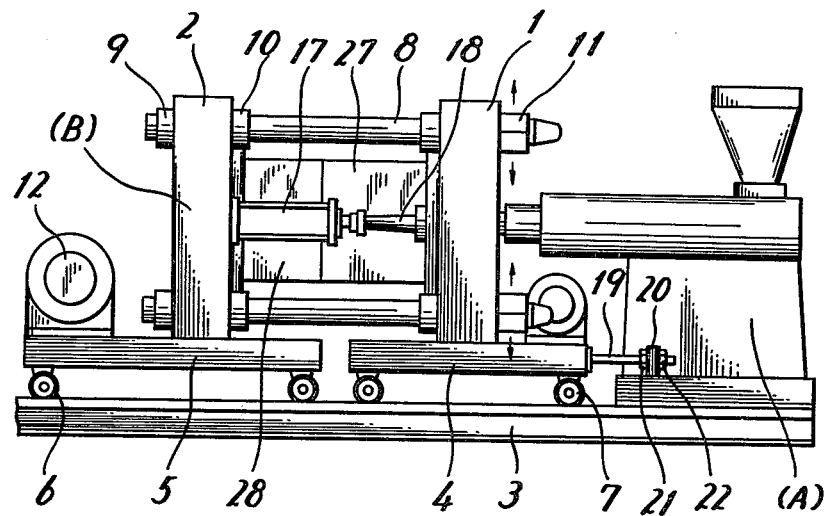
FIG. 1 is a front elevation showing a molding apparatus according to the invention.
Figure 2:
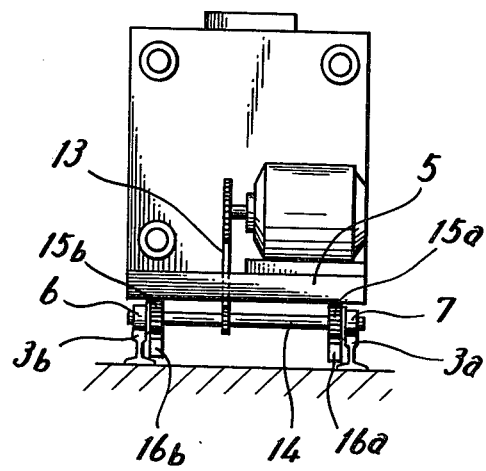
FIG. 2 is a side view of the same.

In FIG. 1, (A) is an extruding means and (B) is a die clamping device, both constituting in combination the molding apparatus of the invention, in which the extruding means (A) is of similar construction to usual extruders. The die clamping device (B) comprises, as shown in FIG. 1, a stationary die plate (1) and a movable die plate (2) arranged face to face and movably mounted on a rail (3a), (3b) by means of bed plates (4) and (5) respectively, both bed plates having wheels (6), (7) attached onto the bottom. To the movable die plate (2) are fixed tie bars (8) for die clamping with nuts (9), (10) and connect the movable die plate (2) to the stationary die plate (1) by penetrating the holes in the stationary die plate. FIG. 1 shows the situation the die is clamped, in which the tie bars are inserted through the holes of the stationary die plate (1) and fastened with nuts (11).

To open the die, the nuts (11) fastening the stationary die plate are unscrewed, and the bed plate (5) is moved left in reference to FIG. 1; the tie bars will accordingly be drawn out of the stationary die plate and separate the movable die plate from it. This motion of the bed plate (5) is effected by a rotary power source, a reduction motor (12) in FIG. 1, driving through a chain (13) a common shaft (14) of gears (15a) and (15b) which are engaged respectively with racks (16a) and (16b) fixed inside the rail (3a), (3b). According to this method of die opening, the interval of die opening can easily be extended by using longer rail with little increase in costs, in contrast to usual injection molding requiring remarkable cost increase for longer opening intervals. However, since a considerable force is usually needed for die opening, oil pressure cylinders (17) are provided on both sides of the movable die plate (2), as shown in FIG. 1, and push the cradles (18) fixed to the stationary die plate to supplement the die opening force as required.

To clamp the die, the movable die plate (2) is shifted right with the tie bars inserted into the holes in the stationary die plate and fastened with nuts (11), which nuts are dividable into two pieces and can be automatically opened and closed and screwed. The stationary die plate (1) is set in contact with the extruding means (A) to keep a suitable nozzle contact by fastening a shaft (19) on the base plate to a shaft cradle (20) on the extruding means with nuts (21) and (22). If the base plate (4) is shifted left with nut (22) unscrewed, the gap between the extruding means and the die will open to allow free extruding of the material without a hitch.

Figure 3:
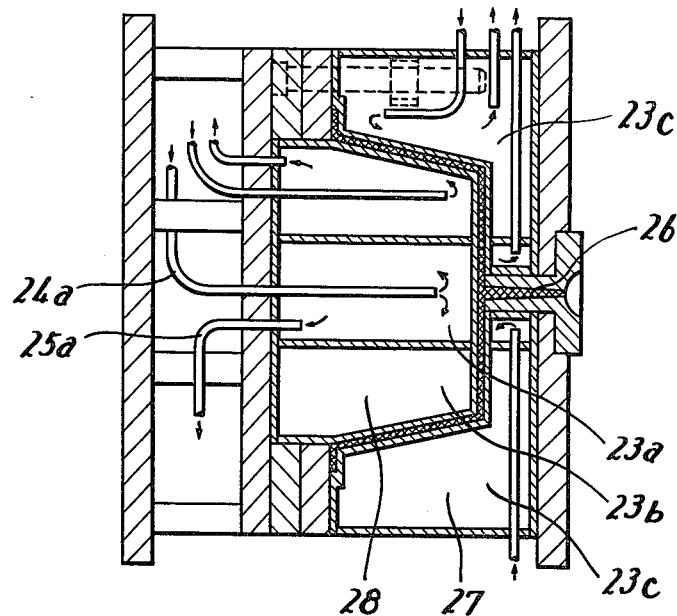
FIG. 3 is a sectional side view of a die used in molding according to the invention.
Figure 4:
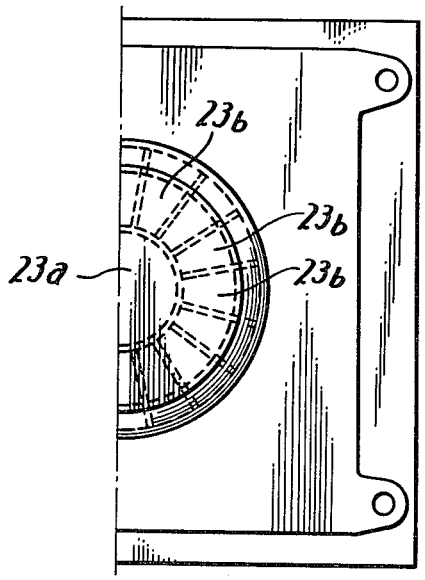
FIG. 4 and FIG. 5 are front views showing respectively an example of movable die piece and an example of fixed die piece.
Figure 5:
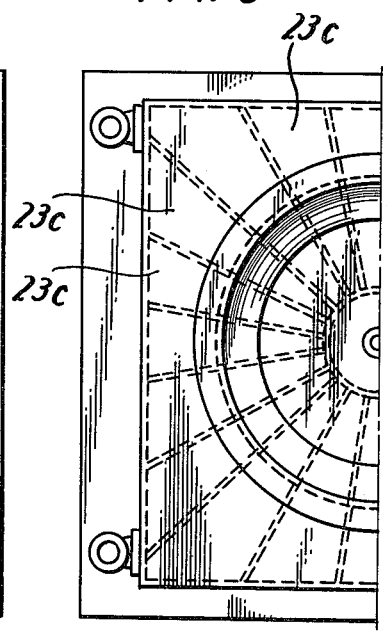

The metal dies to be used in the invention, the construction of which is similar to those used in injection molding at large, comprises, as shown in FIG. 3 to FIG. 5, a cavity or female die piece (27) and a core or male die piece (28) made of thin plates and partitioned into small sections (23a), (23b), (23c), etc., each section having inserted therein a tube (24a) to let in steam for heating or a liquid for cooling and with a tube (25a) for discharging so as to control the temperature in the section separately. Both the cavity (27) and the core (28) are separately fixed to the stationary die plate (1) and the movable die plate (2) to form a fixed die piece and a movable die piece.

In a preferred molding process, the die is first heated to temperatures suitable to keep the fluidity of molten material by letting steam or a hot liquid run through the sections of the die, and a molten material is extruded by means of the extruding means through the spool portion (26) into the die. Since the pressure of material in the extruding means is lower than that in an injection molding machine, a die of thin plate will do, and no powerful clamping mechanism is required. As the injection of material is effected under a lower pressure and at a lower flow rate due to the extruding means used, the die must be kept heated until the material extends throughout the die. Then the heating medium is changed over to a cooling liquid, and after solidification the molded article is taken out of the die.

In the case of an article of complicated shape, the low flow rate of the material may give rise to portions in the die where material cannot extend sufficiently. But this is prevented by controlling the temperature of each section in suitable grouping: higher for portions of lower flow rate and lower for the portions of higher flow rate. It is also an effective measure, if necessary, to provide a small hole at a corner where the material is difficult to penetrate and further to suck air out of the hole.

If an article having thick portion is to be molded, the die is cooled in advance at that portion and an additional amount of molten material, which compensate the contraction of that portion, is pushed in from other hot portion of the die; thus an article of no sink mark will be obtained in spite of low molding pressure.

If the inlet port of supply tube (24a) and the outlet port of discharge tube (25a) of heating medium are arranged at a point of a section in the die requiring heating and cooling most, best efficiency will be obtained, and, if a die is desired to be partially heated and partially cooled, provision of intermediate sections which are filled with air will suffice the requirement.

As described above, the die of the invention is made up with an assembly of thin plates, but is is also recommended that the die is cast into two bodies as well as built up with thin iron plates. And, as the material for casting, aluminum alloys are suitable because they are corrosion resistant and high in heat conductivity.

The molding process of the invention has a drawback that the time of one shot cycle is rather longer than the conventional injection molding, but, for molding large-sized plastics, it is lower in production casts as well as maintenance costs. In addition, the die used in the process, being made of thin plates, is less expensive and easy to handle owing to its light weight; paticularly, the construction of the apparatus that allows the tie bars to separate from the stationary die plate and a large stroke of die opening, permits the replacement of the die without lifting it above the tie bars but by only shifting horizontally, which is impossible in conventional machines, and thus enables to mold large-sized articles even in a factory with low cranes.

Owing to above described characteristics, the method of the present invention makes possible to mold extra-large-sized plastics, which have been impossible to mold by conventional methods, without enlarging the facilities and remarkably reduces the molding costs, which have been high by reason of small size of production lots for such articles.

What I claim is:

1. A process for molding relatively large articles made of plastic material comprising, providing a die clamping device having relatively movable a stationary die plate and a movable die plate mounted on rails for movement of the movable die plate toward and away from the stationary die plate, the movable die plate having tie bars fixed thereto and the stationary die plate having holes therein to receive the tie bars inserted therethrough to secure the movable die plate to the stationary die plate when the die clamping device is closed by moving the movable die plate toward the stationary die plate, providing and fixing a hollow female die piece and a hollow male die piece, each formed of assemblies of thin metal plates and partitioned into independent hollow sections, individually to the stationary die plate and to the movable die plate to jointly define a die cavity when the die clamping device is closed, moving the movable die plate toward the stationary die plate and securing the movable die plate to the stationary die plate by inserting said tie bars through said holes and then applying fastening means thereto to close the die clamping device and to form said die cavity between said male die piece and said female die piece, heating at least one of the male and female die pieces by application of a heating fluid independently internally in the hollow sections thereof with temperatures of the individual sections independently controlled to maintain the fluidity of molten material molded in said die cavity, delivering a molten plastic material by means of an extruder directly into said die cavity at a relatively low pressure and flow rate while simultaneously continuing to apply heated fluid to said at least one of the male and female die pieces until the material extends throughout said die cavity, while delivering said molten plastic material simultaneously applying a suction for removing air from said die cavity by application of suction adjacent a corner of the die cavity to preclude formation of voids in the plastic material, changing said heating fluid over to cooling fluid and setting the plastic material in the cavity by cooling, and opening the die clamping device by removing the fastening means and moving the die plate with the tie bars to draw out the tie bars from the holes in the stationary die plate, whereby the die pieces are separated and a molded article in said cavity is readily removable.

2. A process for molding relatively large articles of plastic according to claim 1, including while applying said heating fluid simultaneously introducing a cooling fluid into at least one of the hollow male and female die pieces for setting the plastic material.

* * * * *